United States Patent [19]
Houston et al.

[11] Patent Number: 5,123,440
[45] Date of Patent: Jun. 23, 1992

[54] SLIDE VALVE

[76] Inventors: James L. Houston, 3534 E. 109 S St., Tulsa, Okla. 74137; Kenneth E. Pope, Rte. 3, Box 217, Wagoner, Okla. 74467

[21] Appl. No.: 653,718

[22] Filed: Feb. 11, 1991

[51] Int. Cl.⁵ ............................................ F16K 25/04
[52] U.S. Cl. ...................................... 137/375; 251/326
[58] Field of Search .......................... 251/326; 137/375

[56] References Cited

U.S. PATENT DOCUMENTS

| | | | |
|---|---|---|---|
| 3,964,507 | 6/1976 | Jandrasi et al. | 137/375 |
| 4,253,487 | 3/1981 | Worley et al. | 137/375 |
| 4,615,506 | 10/1986 | Houston | 137/375 X |
| 4,693,452 | 9/1987 | Jandrasi | 251/326 X |

Primary Examiner—John C. Fox
Attorney, Agent, or Firm—Head & Johnson

[57] ABSTRACT

A slide valve for use in applications where gated fluid temperatures may exceed approximately 1600° F. and exterior valve wall temperatures may be less than approxiamtely 600° F. connects the valve bed plate to the valve body by use of a ring of conical cross section which is resiliently flexible in a response to thermal expansion or contraction of the ring so as to maintain the valve bed plate in a fixed relationship with respect to the valve body over a preselected temperature range. In one preferred embodiment of the invention, the valve orifice is propped against the valve bed plate by supports mounted on gussets that have grooves alternately spaced in their opposite faces so as to provide a heat sink between the orifice and the valve body. In another preferred embodiment intended for use in applications where the gated fluid temperature ranges from approximately 1000° F. or less to an exterior valve body temperature of 600° F. or less, the bed plate is connected to the valve body by an annular ring having concentric grooves alternatively spaced in opposite faces of the ring to define a heat sink between the bed plate and the body. The bed plate and the annular ring may be of a unitary construction.

24 Claims, 4 Drawing Sheets

SLIDE VALVE

BACKGROUND OF THE INVENTION

This invention relates generally to slide valves and more particularly concerns cold wall slide valves.

Some typical slide valves and improvements to slide valves are shown in my U.S. Pat. Nos. 4,378,817, 4,615,506 and 4,671,313.

In a typical hot wall application for a slide valve, the difference in temperature between the gated fluid and the external valve body is not so significant as to produce any appreciable relative contraction or expansion between valve components as to require complex and expensive engineering to compensate for the variations. Consequently, a relatively simple and inexpensive carbon steel valve is adequate to most hot wall valve applications.

However, in cold wall valve applications, the difference in temperature between the gated fluid and the exterior valve wall can be substantial. For example, a cold wall valve may typically be used at approximately 1600° F. fluid temperature and approximately 600° F. exterior valve wall temperature.

One present solution deals with this difficulty by using stainless rather than carbon steel in the valve components and essentially eliminating the effects of temperature change. This choice of materials, of course, is a compromise to necessity that greatly increases the cost of the valve.

Another solution is to make a slide valve of carbon steel components but to line the interior surface of the valve wall with an erosion resistant refractory or insulation to provide a heat sink between the gated fluid and the valve wall. Usually, the valve employs a refractory lined orifice which is sandwiched between a bed plate and fixed supports above and below the orifice. The bed plate is fixed to the refractory lining the valve wall. However, over a wide temperature differential between the gated fluid and the valve wall, the refractory may expand or contract by as much as ⅜ of an inch or more. Consequently, the bed plate becomes a floating plate and the valve mechanism for gating fluid through the orifice must also be designed to float in order to achieve satisfactory valve operation.

A further problem sometimes experienced with slide valves is that their orifice supports are mounted on gusset plates welded to the interior surface of the valve wall and heat transfer frequently causes the welds between the gussets and the valve wall to crack or break.

Accordingly, it is a primary object of this invention to provide a cold wall slide valve having a fixed bed plate. It is a further primary object of this invention to provide a cold wall slide valve which minimizes failure of the gusset plate welds. And it is among the objects of this invention to provide a cold wall slide valve which can be made of relatively inexpensive materials, with relatively simple components and effective over a wide temperature differential.

SUMMARY OF THE INVENTION

In accordance with the invention, a slide valve for use in applications where gated fluid temperatures may exceed approximately 1600° F. and exterior valve wall temperatures may be less than approximately 600° F. connects the valve bed plate to the valve body with a ring of conical cross section resiliently flexible in a response to thermal expansion or contraction so as to maintain the bed plate in a fixed relationship with respect to the body over a preselected temperature range.

In one preferred embodiment of the invention, the valve orifice is propped against the bed plate by supports mounted on gussets that have grooves alternately spaced in their opposite faces so as to provide a heat sink between the orifice and the valve body.

In another preferred embodiment intended for use in applications where the gated fluid temperature ranges from approximately 1000° F. or less to an exterior valve body temperature of 600° F. or less, the valve bed plate may be connected to the valve body by an annular ring having concentric grooves alternatively spaced in its opposite faces to define a heat sink between the bed plate and the body. The bed plate and the annular ring may be of unitary construction.

BRIEF DESCRIPTION OF THE DRAWINGS

Other objects and advantages of the invention will become apparent upon reading the following detailed description and upon reference to the drawings in which.

Figure 1:
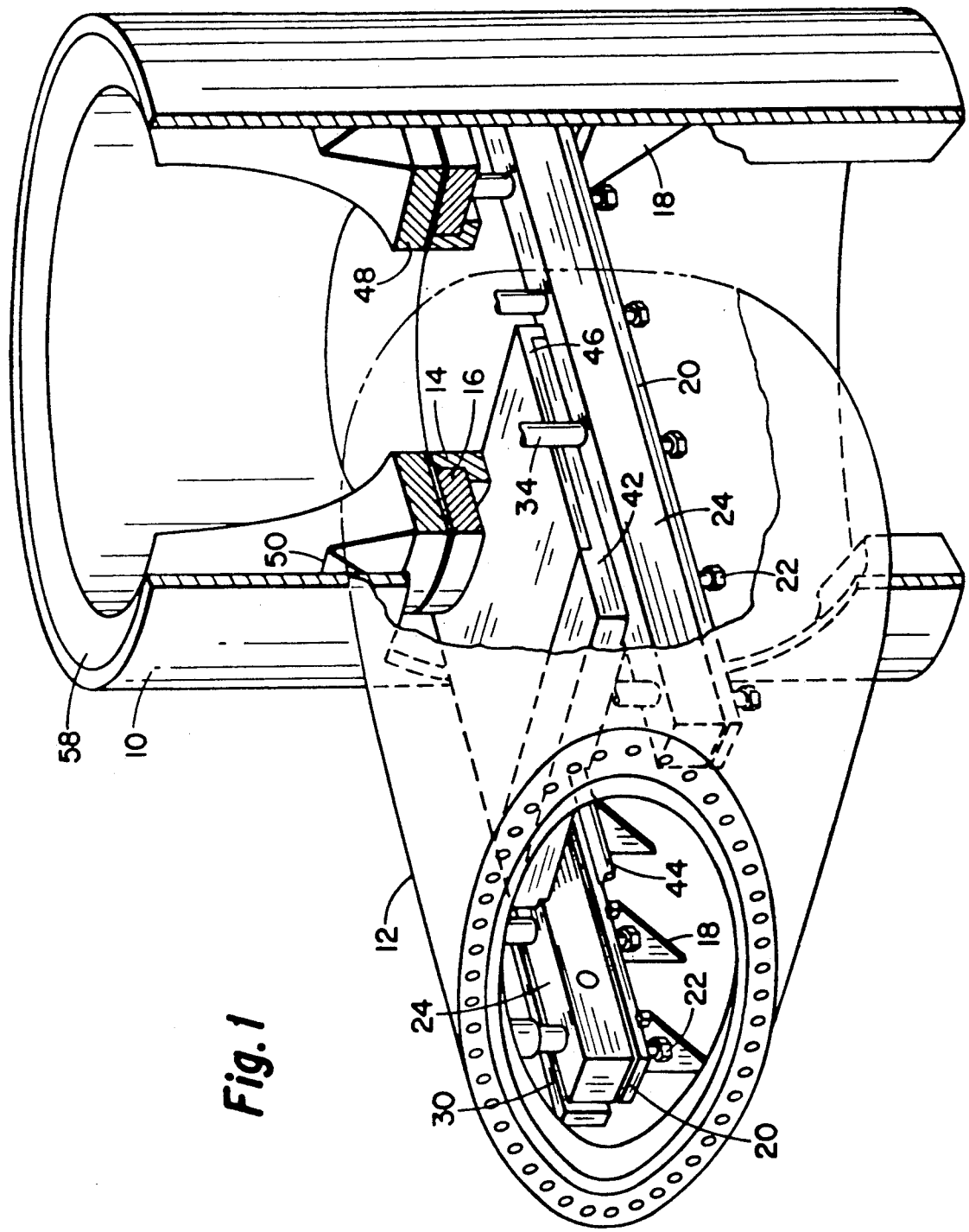
FIG. 1 is a perspective view with parts broken away of a flexible cone embodiment of the slide valve.
Figure 2:
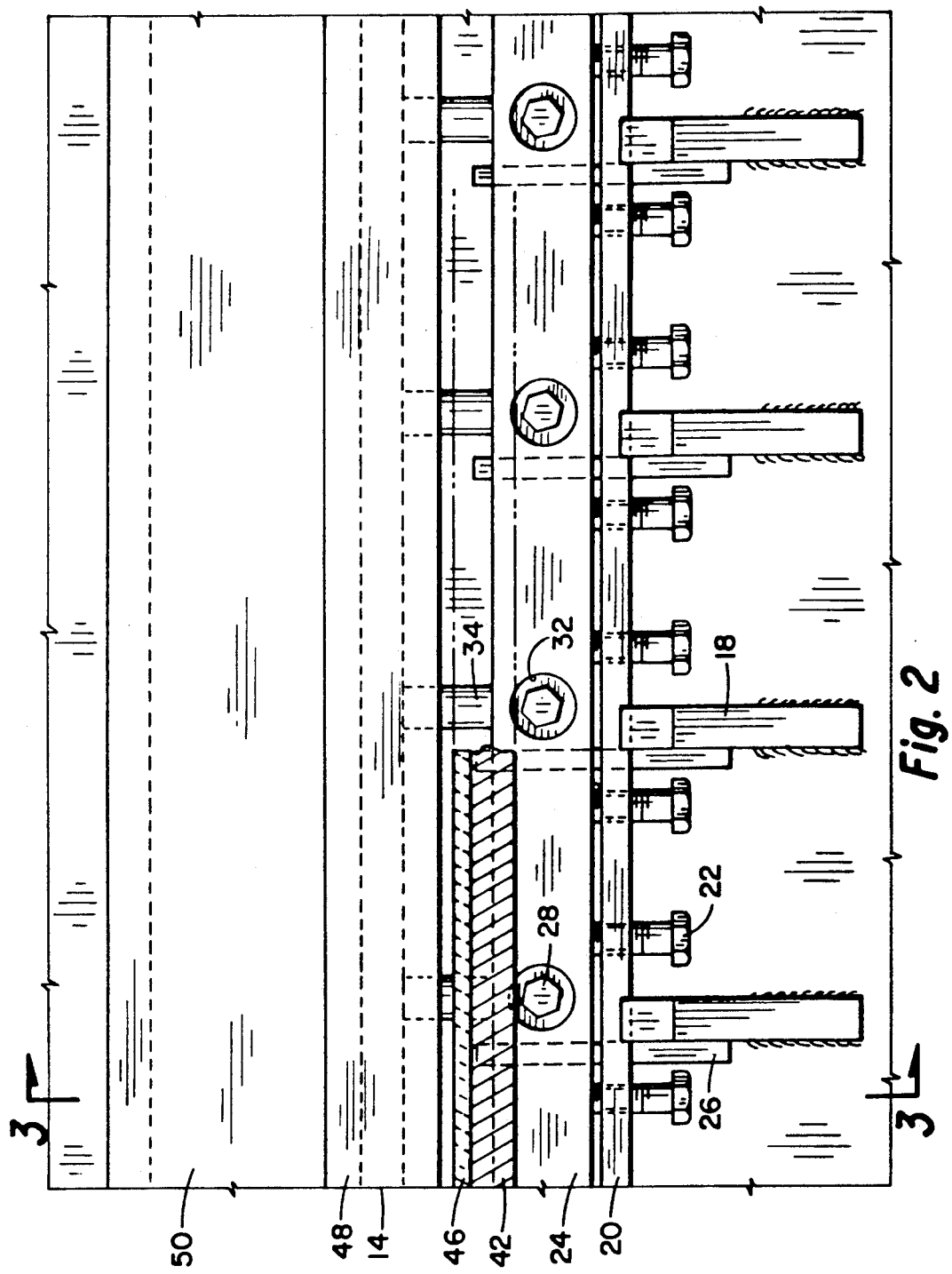
FIG. 2 is an interior elevational view illustrating the fluid gating mechanism in the slide valve of FIG. 1.
Figure 3:
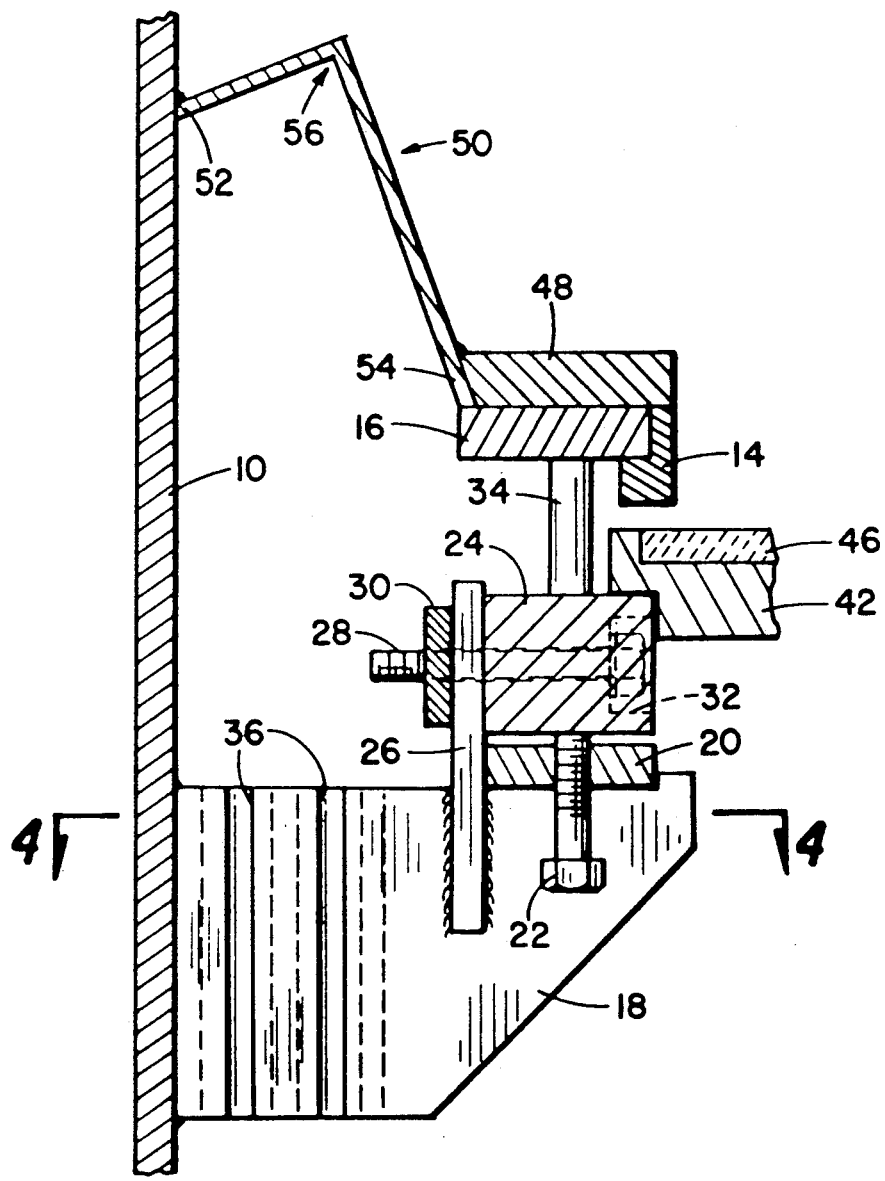
FIG. 3 is a cross-sectional view taken along the line 3—3 of FIG. 2.
Figure 4:
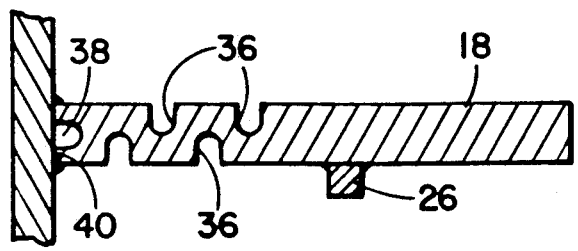
FIG. 4 is a cross-sectional view taken along the line 4—4 of FIG. 3.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Turning first to FIGS. 1 through 4, a cold wall slide valve is illustrated having a cylindrical body portion 10 and a bonnet body portion 12. The fluid path through the valve is defined by a removable orifice 14 welded or otherwise secured to or integral with mounting ring 16. The removable orifice 14 and the ring 16 are disposed within the cylindrical portion of the body 10.

To prop or support the orifice 14 within the cylindrical body portion 10, a plurality of gussets 18 are mounted on the interior surface of the cylindrical body portion 10 and the bonnet body portion 12. Parallel support bars 20 extend horizontally across the top of the gussets 18 and a plurality of jack bolts 22 are threaded upwardly through the support bars 20. Parallel guides 24 are horizontally seated on top of the jack bolts 22 above the support bars 20 so that rotation of the jack bolts 22 within the threaded portions of the support bars 20 will adjust the level of the guides 24. Each of the gussets 18 also has a guide support upright 26 welded to it. A plurality of guide clamping bolts 28 extend horizontally through the guide bars 24 and guide clamping bars 30 with the guide support uprights 26 sandwiched between them. Thus the guide clamping bolts 28 can be tightened to lock the guides 24 to the uprights 26, securing the guides 24 at the elevation set by the vertical jack bolts 22. As shown, countersinks 32 are provided in the guides 24 so as to flush the heads of the bolts 28 for clearance between the guides 24. Vertical support columns 34 seated on the guides 24 in turn support the mounting ring 26 to which the removable orifice 14 is connected.

The gussets 18 may be adapted to serve as heat sinks to achieve desirable temperature drops between the gated fluid and the valve body 10 by a plurality of grooves 36 in opposite faces of the gussets 18. The grooves 36 are preferably alternately oppositely spaced and covered with refractory and define an elongated thermal path across each of the gussets 18. In addition, a groove 38 may also be provided in the mounting edge 40 of each of the gussets 18 to minimize the surface area contact between the gussets 18 and the valve body 10 to which they are welded. Preferably, the grooves 36 are equally alternately spaced in parallel arrangement to the joint with the valve body 10. Other arrangements are possible and other portions of the gusset 18 may also be removed depending on the thermal qualities required, provided the structural strength of the gussets 18 is not compromised.

In addition to forming a part of the support mechanism for the orifice 14, the guides 24 also bear a sliding gate 42 which is connected to a valve stem 44 which in turn may be operated to affect the opening and closing of the valve orifice 14 and control the flow of fluid therethrough. The gate 42 is covered by a layer of refractory 46 on its upper surface.

In the embodiment shown in FIGS. 1 through 4, the orifice 14 and mounting ring 16 are propped by the columns 34 against a bed plate 48. As shown, the bed plate 48 is an annular member held in position over the orifice 14 and the ring 16 by a connecting member 50. The connecting member 50 is also an annular ring having a conical cross-section with one of its base ends 52 fixed to the cylindrical portion of the body 10 and the other of its base ends 54 fixed to the bed plate 48. The apex angle 56 of the member 50 should be at or above the level at which the one base end 52 connects to the body 10. Preferably, the apex angle 56 will be a minimum of 90°. The member 50 is made of flexibly resilient thermally suitable material shaped and dimensioned to flex in response to thermal expansion or contraction of the member 50 so as to maintain the bed plate 48 in a fixed relationship to the body 10. Thus substantially significant temperature differentials between the bed plate 48 and the valve body 10 can be achieved while maintaining a fixed relationship between the bed plate 48 and the valve body 10. Refractory 58 layered on the interior walls of the valve body 10 is contoured to direct flow of the gated fluid into the orifice 14, but, since the bed plate 48 is fixed to the member 50 rather than the refractory 58, expansion or contraction of the refractory 58 does not effect the positioning of the bed plate 48 or the orifice 14.

Figure 5:
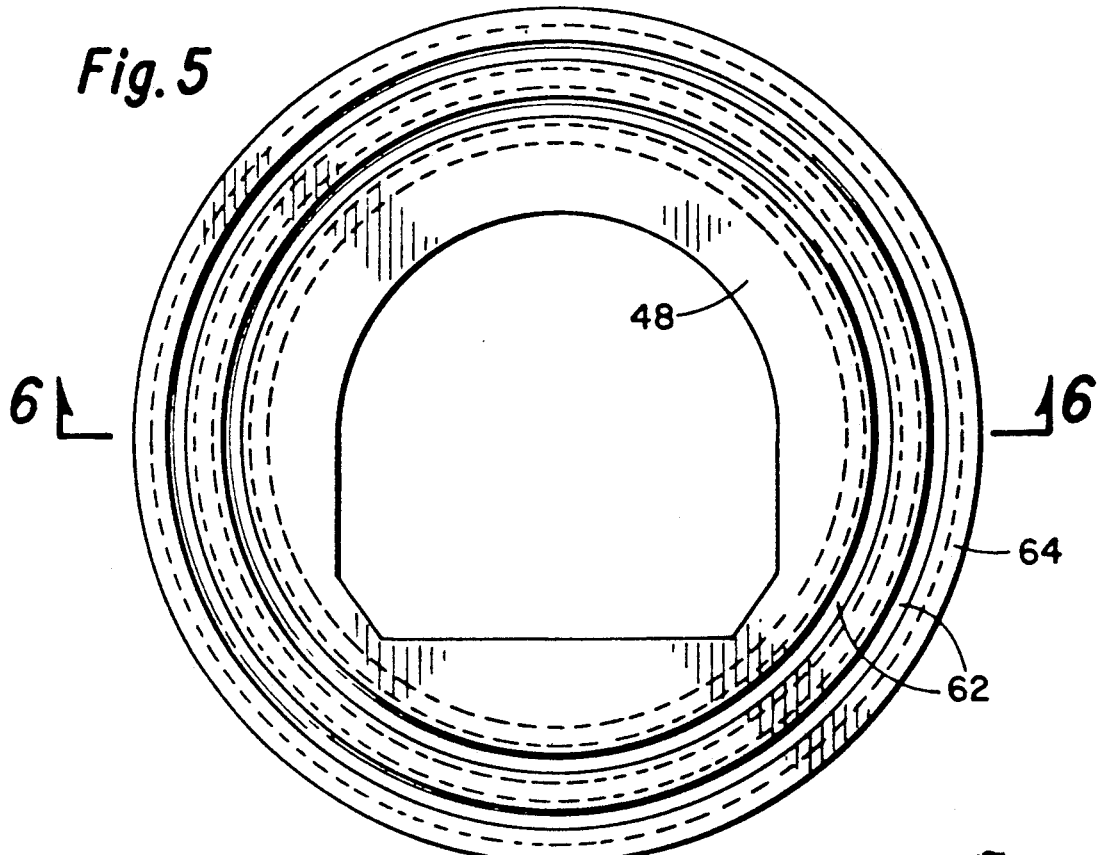
FIG. 5 is a top view of a grooved annular ring and bed plate for use in an alternate embodiment of the slide valve.
Figure 6:
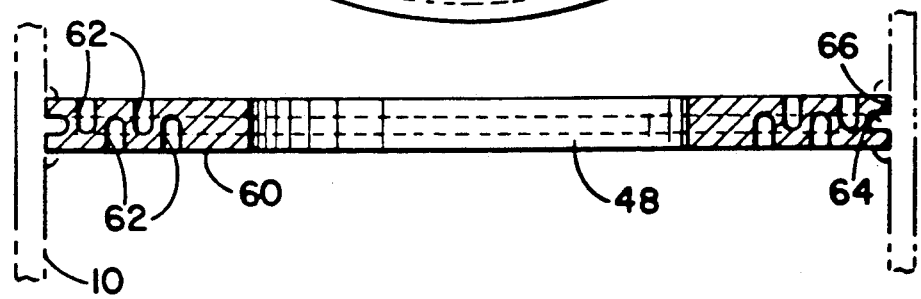
FIG. 6 is a cross-sectional view taken along the line 6—6 of FIG. 5.

Turning to FIGS. 5 and 6 an alternate connector for fixing the bed plate 48 to the valve body 10 is illustrated. In this embodiment, the bed plate 48 is mounted within an annular member 60 which is in turn welded to the valve body 10. The annular member 60 is provided with a plurality of refractory covered grooves 62, preferably concentrically alternately disposed in opposite faces of the annular member 60. The grooves 62 cause the annular member 60 to function as a heat sink by increasing the length of the thermal path from the interior of the member 60 to the exterior of the member 60. The heat sink capabilities of the annular member 60 may further be enhanced by another groove 64 disposed in the edge 66 of the annular member 60 that is welded to the valve body 10.

Depending on the required temperature drop from the gated fluid to the valve body 10, various combinations of the above improvements may be employed in order to achieve a fixed bed plate cold wall slide valve. For example, the flexing conical ring 50 has been found to be most effective in slide valves having a temperature drop ranging from approximately 1600° F. to 600° F. while the grooved annular member 60 has been found to be adequate when the temperature drop is in the range of approximately 1000° F. to approximately 600° F. Furthermore, the use of heat sink gussets may not be necessary in all applications.

Thus, it is apparent that there has been provided, in accordance with the invention, a slide valve that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A slide valve comprising:
   a valve body;
   orifice means within said body for passing fluid therethrough;
   sliding gate means for controlling the flow of fluid through said orifice means;
   means fixed to said body for supporting said orifice means and said gate means therein;
   a bed plate for securing said orifice means against said supporting means; and
   means connecting said plate to said body, said means being resiliently flexible in response to thermal expansion or contraction thereof to maintain said plate in fixed relationship to said body over a preselected temperature range.

2. A slide valve according to claim 1, a portion of said body being cylindrical, said plate being annular and said connecting means comprising a ring of conical cross-section having a first base end fixed to said cylindrical body portion and a second base end fixed to said plate.

3. A slide valve according to claim 2, said first base end being above said second base end and said cross-section having an apex not lower than level with said first base end.

4. A slide valve according to claim 3, said apex being at least 90° F.

5. A slide valve according to claim 4, said preselected temperature range extending from approximately 600° F. to approximately 1600° F.

6. A slide valve according to claim 1, said supporting means comprising a plurality of gusset means fixed to said body and means mounted on said gusset means for propping said orifice means and for bearing said sliding gate means.

7. A slide valve according to claim 6, each of said gusset means comprising a gusset plate having grooves alternately spaced in opposite faces of said gusset plate to provide a heat sink between said propping and bearing means and said body.

8. A slide valve according to claim 7, said grooves being parallel to a portion of said body to which said gusset plate is fixed.

9. A slide valve according to claim 8, said gusset plate having a groove in an edge thereof fixed to said body.

10. A slide valve comprising:
a valve body;
orifice means within said body for passing fluid therethrough;
sliding gate means for controlling the flow of fluid through said orifice means;
a plurality of gusset plates fixed to said body and means mounted on said gusset plates for propping said orifice means and for bearing said sliding gate means, each of said gusset plates having grooves alternately spaced in opposite faces thereof to provide a heat sink between said propping and bearing means and said body;
a bed plate for securing said orifice means against said propping means; and
means connecting said bed plate to said body, said means being resiliently flexible in response to thermal expansion or contraction thereof to maintain said bed plate in fixed relationship to said body over a preselected temperature range.

11. A slide valve according to claim 10, a portion of said body being cylindrical, said bed plate being annular and said connecting means comprising a ring of conical cross-section having a first base end fixed to said cylindrical body portion and a second base end fixed to said bed plate.

12. A slide valve according to claim 11, said first base end being above said second base end and said cross-section having an apex not lower than level with said first base end.

13. A slide valve according to claim 12, said apex being at least 90° F.

14. A slide valve according to claim 13, said preselected temperature range extending from approximately 600° F. to approximately 1600° F.

15. A slide valve according to claim 10, said grooves of each of said gusset plate being parallel to a portion of said body to which said gusset plate is fixed.

16. A slide valve according to claim 15, each of said gusset plates having a groove in an edge thereof fixed to said body.

17. A slide valve comprising:

a valve body;
orifice means within said body for passing fluid therethrough;
sliding gate means for controlling the flow of fluid through said orifice means;
means fixed to said body for supporting said orifice means and said gate means therein;
a bed plate for securing said orifice means against said supporting means; and
means connecting said plate to said body, said connecting means having a cross-section defining a heat sink between said plate and said body.

18. A slide valve according to claim 17, a portion of said body being cylindrical, said plate being annular and said connecting means comprising an annular member having concentric grooves alternately spaced in opposite faces thereof.

19. A slide valve according to claim 18, said member having a groove in an edge thereof fixed to said body.

20. A slide valve according to claim 17, said supporting means comprising a plurality of gusset means fixed to said body and means mounted on said gusset means for propping said orifice means and for bearing said sliding gate means.

21. A slide valve according to claim 20, each of said gusset means comprising a gusset plate having grooves alternately spaced in opposite faces of said gusset plate to provide a heat sink between said propping and bearing means and said body.

22. A slide valve according to claim 21, said grooves being parallel to a portion of said body to which said gusset plate is fixed.

23. A slide valve according to claim 22, each of said gusset plates having a groove in an edge thereof fixed to said body.

24. A slide valve comprising:
a valve body;
orifice means within said body for passing fluid therethrough;
sliding gate means for controlling the flow of fluid through said orifice means;
means fixed to said body for supporting said orifice means and said gate means therein;
a bed plate for securing said orifice means against said supporting means; and
means connecting said plate to said body, said means for maintaining said plate in fixed relationship to said body over a preselected temperature range.

* * * * *